US008316407B2

(12) United States Patent
Lee et al.

(10) Patent No.: US 8,316,407 B2
(45) Date of Patent: Nov. 20, 2012

(54) VIDEO SYSTEM INTERFACE KERNEL

(75) Inventors: Mi-Suen Lee, New York, NY (US);
Yun-Ting Lin, White Plains, NY (US);
Carolyn Christine Ramsey,
Pleasantville, NY (US); Tomas Brodsky,
Croton on Hudson, NY (US)

(73) Assignee: Honeywell International Inc.,
Morristown, NJ (US)

( * ) Notice: Subject to any disclaimer, the term of this patent is extended or adjusted under 35 U.S.C. 154(b) by 1424 days.

(21) Appl. No.: 11/397,776

(22) Filed: Apr. 4, 2006

(65) Prior Publication Data
US 2006/0225120 A1    Oct. 5, 2006

Related U.S. Application Data

(60) Provisional application No. 60/668,447, filed on Apr. 4, 2006.

(51) Int. Cl.
*H04N 7/173* (2006.01)
*H04N 7/18* (2006.01)

(52) U.S. Cl. .................................. 725/117; 348/143

(58) Field of Classification Search .................. 348/143; 725/117
See application file for complete search history.

(56) References Cited

U.S. PATENT DOCUMENTS

| 2004/0130620 | A1* | 7/2004 | Buehler et al. ............ 348/143 |
| 2004/0143602 | A1* | 7/2004 | Ruiz et al. .................. 707/104.1 |
| 2004/0233983 | A1* | 11/2004 | Crawford et al. ........ 375/240.01 |

OTHER PUBLICATIONS (Title: Relevant Image Detection in a Camera, Recorder, or Video Streaming Device), concurrently filed, Brodsky et al.

* cited by examiner

*Primary Examiner* — Jay Patel
*Assistant Examiner* — Richard Torrente
(74) *Attorney, Agent, or Firm* — Husch Blackwell

(57) ABSTRACT

A video interface kernel with a defined application program interface includes each of a plurality of core functions for interfacing with video equipment and video processing subsystems. The core functions include such functions as video capture and video output, video recording and playback, and event notification. Functions of the video interface kernel also include video analysis functions and/or interfaces to analysis subsystems, as well as interfaces to point-of-sale terminals, access control systems, and location tracking systems. An intelligent video management module facilitates managing the interactions among the other modules of the kernel, further simplifying the application level interface.

33 Claims, 1 Drawing Sheet

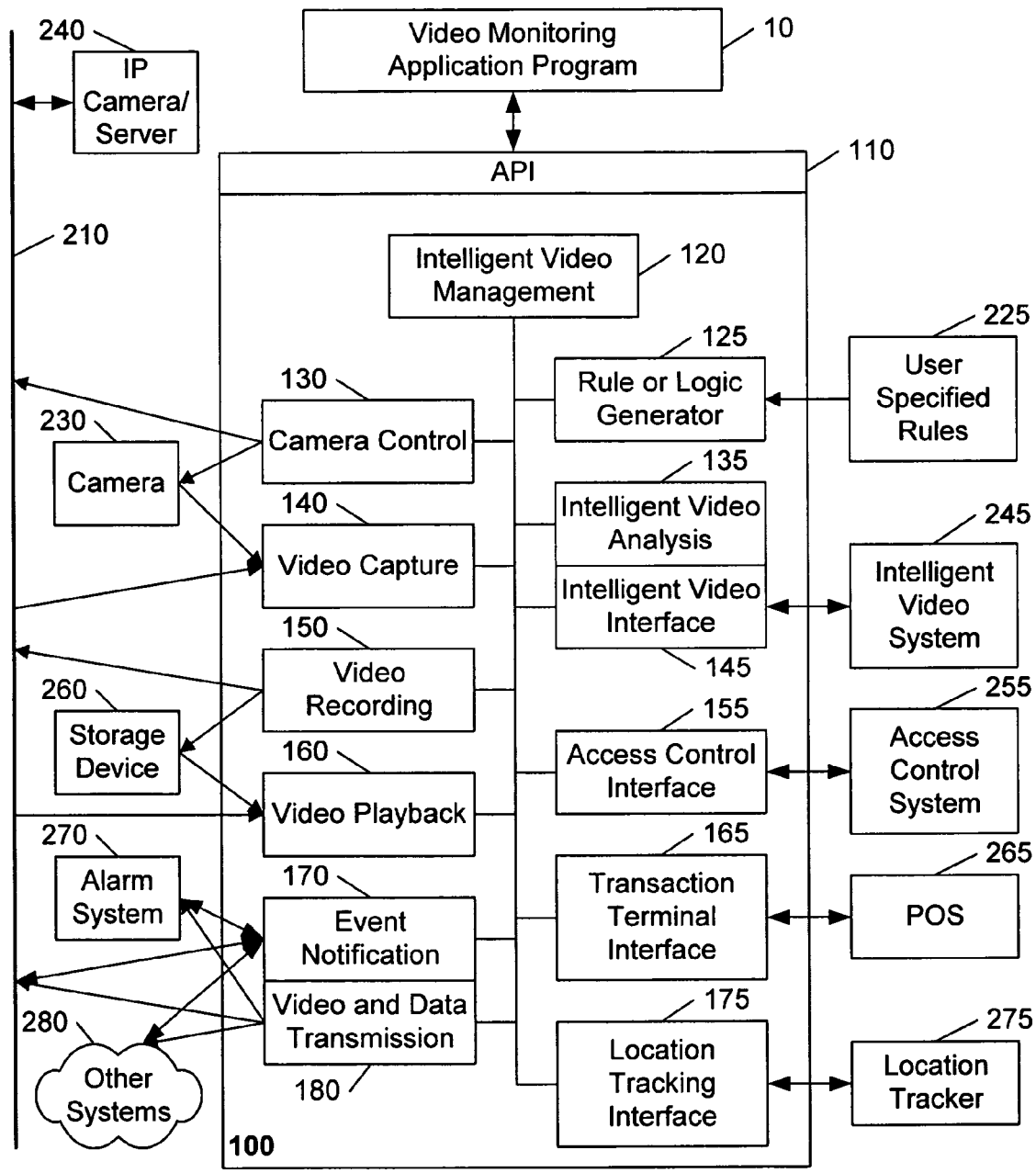

VIDEO SYSTEM INTERFACE KERNEL

This application claims the benefit of U.S. Provisional Patent Application 60/668,447, filed 4 Apr. 2006.

BACKGROUND AND SUMMARY OF THE INVENTION

This invention relates to the field of video analysis and management, and in particular to a core interface system that facilitates the creation of video monitoring systems.

The demand for video monitoring systems continues to increase, and what had once been a specialized, limited-competition market is becoming increasingly competitive. Video equipment manufacturers are facing increasing market pressures to provide system solutions, rather than bare components.

All video monitoring systems require certain basic video functions, such as a video capture function, a video output function, and an interface to these functions. In like manner, many video monitoring systems share a requirement for a set of common video functions, such as video recording and playback functions, event notification functions, and an interface to these functions. Typically, developers and system integrators select the components that will be used to create the video monitoring system, and then develop and/or integrate the functions and interfaces into the application program that provides the functionality of the video monitoring system. Although many standards exist at the physical interface level for communicating with components and devices, such standards do not yet exist at the video application level, and each video application program requires a design that is custom crafted for the particular video monitoring system and its intended functions.

It is an object of this invention to ease the task of creating a video application program. It is a further object of this invention to eliminate the need to custom design modules to provide basic and common video functions, herein termed core video functions, for each application.

These objects, and others, are achieved by providing an interface kernel with a defined application program interface that includes each of a plurality of core functions for interfacing with video equipment and video processing subsystems. The core functions include such functions as video capture and video output, video recording and playback, and event notification. Optional embodiments include video and data transmission functions, video analysis functions and/or interfaces to analysis subsystems, as well as interfaces to point-of-sale terminals, access control systems, and location tracking systems. An intelligent video management module facilitates managing the interactions among the other modules of the kernel, further simplifying the application level interface.

BRIEF DESCRIPTION OF THE DRAWINGS

The invention is explained in further detail, and by way of example, with reference to the accompanying drawing wherein:

FIG. 1 illustrates an example block diagram of a video monitoring interface kernel in accordance with this invention.

The drawing is included for illustrative purposes and is not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention enables video equipment manufacturers, security system solution providers, and others to quickly assemble and customize video monitoring systems and applications for deployment with minimal software development effort. Instead of writing interfaces to multiple independent components and systems, this invention provides a single, unified interface for interacting with these components and systems. This system also provides the core elements necessary to provide basic and common functionalities to interact with video capture, recording, and playback systems. A preferred embodiment is configured as a kit that enables distributors of video capture and recording components to deliver full solutions, and focus energy on user interface and other enhancements aimed at particular market segments.

FIG. 1 illustrates an example block diagram of a video interface kernel 100 in accordance with multiple aspects of this invention. The kernel 100 provides a single application program interface (API) 110 that allows a developer to integrate a plurality of video components and systems within a video monitoring application 10. As noted above, all video monitoring applications, for example, require a video capture capability. The API 110 is provided to allow an application 10 to issue commands and requests to the kernel 100 to capture video, independent of the particular devices or subsystems that actually provide the video. The API 110, for example, allows an application to issue a (paraphrased) "Get next image from camera abc" command, or a "Stream images from DVR xyz, starting from 7:00am" command, without being aware of how camera abc or DVR xyz are operated or controlled.

The video capture module 140 contains a collection of functions for capturing video from analog and digital cameras 230, and to request video from a wide variety of IP-based cameras, digitally compressed video, video servers, network videos, and the like, collectively illustrated as IP-device 240, via an IP-network 210. Depending upon the particular configuration, the video capture module 140 may interact directly with the devices 230 and network 210, or it may capture the video via the use of a conventional 'frame grabber' (not illustrated) that interacts with particular devices 230 and network 210. The video capture module 140 also provides a video output function, by facilitating access to the captured video data. In a preferred embodiment, the video capture module 140 stores the captured video frames in a video buffer, preferably structured as a ring buffer, that other modules, including the API module 110, in the kernel 100 can access.

The kernel 100 also includes video playback 160 and record 150 modules. In a preferred embodiment, the record module 150 compresses the captured video and stores the frames in the storage device 260, or at a remote storage (not illustrated) via an IP network 210. The record module 150 includes at least one software compression module, and, optionally, one or more interfaces for controlling compression using hardware compression boards. The API 110 is configured to allow the application 10 to control select recording parameters, such as frame-rate, resolution, quality level, and the like, and accepts both immediate-execution commands, as well as scheduled-execution commands. Of particular note, the control options at the API 110 are defined to be independent of specific commands required by the particular recording device to effect these options, thereby relieving the developer of the application program 10 from the task of designing, testing, and verifying each interface to the recording devices, and from the task of integrating compression algorithms with each recording function. Similar recording control options are provided to other modules within the kernel 100, preferably via the video management module 120.

The video playback module 160 decompresses the video stored in a digital media device, either local 260, or at a remote location accessible via the IP network 210. The playback module 160 preferably includes both software decompression modules as well as one or more interfaces to hardware decompression devices. Similar to the video capture module 140, the playback module 160 provides a video output function, preferably by storing the playback frames in a ring buffer that other modules in the system, including the API 110, can access. The API 110 is configured to provide a similar set of control options to the application program 10 as provided for the record module 150, discussed above, thereby achieving the same advantages of relieving the developer of the program 10 of the details required to retrieve images from the video storage devices.

The event notification module 170 contains a collection of functions to control the sending and receiving of event notifications from a variety of external components, illustrated herein as being components of an alarm system 270, or other systems 280. In a preferred embodiment, the event notification module 170 also contains functions to send email, text messages, and phone messages, typically via the IP network 210, although other network interfaces may be provided. The API 110 is configured to allow the program 10 to check the status of any external sensor, and, in a preferred embodiment, allows the program 10 to provide conditional commands, such as "record images from camera abc to recorder hij whenever sensor xyz is triggered". Similar conditional commands may be provided for sending event notifications, as well.

The video and data transmission module 180, which may be included in the event notification module 170, provides an interface for transmitting video to specified destinations, generally in response to an occurrence of an event. For example, in addition to sending an alarm notification to the alarm system 270, the event notification module 170 may be configured to simultaneously initiate a streaming of the images from the appropriate camera 230 to the alarm system 270, or other system 280, optionally via the IP network 210. In like manner, the application program 10 may direct the video and transmission module 180 to send 'snap shot' along with annotation data each time a particular event happens. For example, in an access monitoring application, the application program 10 may configure the kernel to send a snap shot annotated by time-of-day and system status each time a count of the number of people entering a building is incremented, or each time the application program 10 fails to recognize a person entering a building.

The camera control interface module 130 contains a collection of functions to send camera control parameters to local analog or digital cameras 230, or remote cameras and servers, via the network 210. Generally, these functions are embodiments from the software development kit (SDK) provided by the camera and video server manufacturers, and are provided to relieve the developer of the program 10 from the details of such kits by providing API commands that are substantially device-independent.

The intelligent video analysis module 135 contains functions to detect, track, and classify objects in the video, collect statistics about these objects, analyze the activities of these objects, and report suspicious events and behavior observed in the video. This module takes video captured in the ring buffer by the video capture interface module; applies a sequence of processing to the video frames; and outputs objects and events data. In a preferred embodiment of this invention, the video analysis module 135 includes a "relevant image detector" that is configured to classify images based on characteristics of target objects of relevance to the application program 10, as detailed in copending U.S. patent application, "RELEVANT IMAGE DETECTION IN A CAMERA, RECORDER, OR VIDEO STREAMING DEVICE", Ser. No. 11/397,780 filed Apr. 4, 2006 for Tomas Brodsky, Mi-Suen Lee, Carolyn Ramsey, and Yun-Ting Lin, and incorporated by reference herein.

An interface 145 to external video analysis systems is also provided, which may be included within the video analysis module 135. The interface 145 is configured to interface with other intelligent video systems to provide features available within video processing technology, including, for example, video-based biometrics system (e.g. face detection and recognition, iris recognition, fingerprints recognition and so on), or other pattern recognition systems (e.g. license plate recognition), and various video processing modules. In a preferred embodiment, the interface 145 allows external intelligent video systems to register new processing module and new functions to the system, to provide the application program 10 a richer set of intelligent video algorithms made by various vendors. In this manner, the advantages of this invention are realized by other developers as well; that is, vendors of new video processing technology need only develop, test, and verify their interface to the kernel 100, and not to each application program 10.

The output from both interfaces 135, 145 is stored in an internal database at the kernel 100 for access by the other modules, preferably via the management module 120. The API 110 provides the application program 100 access to this information as well, again using an interface structure that is independent of the particular video analysis program or module.

Video systems are often used for monitoring transaction devices, such as ATMs, cash registers, and other point-of-sales (POS) terminals. The transactional terminal interface module 165 contains functions that interface with a wide variety of POS and other transaction systems 265 to receive transactional data. The API 110 provides common POS functions to the application program 10, and maps these functions to each of the particular POS systems, typically by using the SDK provided by the POS system manufacturers. Note that in this example embodiment, the application program 10 is likely to be a transaction processing application, and not, per se, a conventional video processing application. That is, although the kernel 100 is particularly well suited for conventional video processing applications, it also provides advantages for applications wherein the video processing is only a minor component.

The access control interface module 155 includes functions that interface with various access control systems 255, and the location tracker module 175 includes functions that interface with various location tracking systems 275. As with the other modules, the API 110 provides device-independent functions to the application program 10, and maps these functions to the particular access control systems 255 and location tracking systems 275, typically using the SDK provided by the access control system manufacturers.

The intelligent CCTV management module 120 monitors and analyzes data from the intelligent video analysis modules 135, 145, the transaction data terminal module 165, the access control module 155, and the location tracking module 175. It uses a collection of rule-based inferences, for example, to determine a) when to raise an alarm to alert user of suspicious activities in the scene; b) when to record video and at which resolution, quality and/or frame rate; c) which camera parameter to adjust; d) how video, transaction, access control and location data are displayed, including, for example, overlaying text or highlighting information on the video, based on the occurrence of an event; e) how to adjust access control conditions, such as initiating a security procedure based on the occurrence of an event; f) when to enable the detection of certain events in the intelligent video analysis module, including, for example, activating select object-detecting algorithms based on the occurrence of an event; and so on.

A rule/logic generator 125 provides an interface that allows the 3$^{rd}$ party developers or solution integrators to define rules 225 that link the reasoning results from multiple modules in the kernel 100. For instance, to link a 'no-sale' record in the POS system to trigger high-frame-rate alarm video recording in the video recording system, the interface 125 allows the user to program the logic accordingly. That is, the rule/logic generator 125 allows a user to specify a sequence of system responses that are to occur when specific events or conditions are detected.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. An interface kernel comprising:
a video capture module that receives images from one or more video sources,
a video recording module that records images to one or more storage devices,
a video playback module that plays back images from the one or more storage devices,
an event notification module that provides one or more notifications to an external notification system based on a detection of an event based on one or more of the images,
a management module that uses a predefined set of rule-based inferences to control one or more of the modules of the kernel, independently of commands received by the application program interface from the application program; and
a rule generator that provides an interface to a user to define rules for the predefined set of rule-based inferences; and
an application program interface that is independent of rule generator interface and that accepts commands from an application program to control each of the video capture, video recording, video playback, event notification, and management modules, and the rule generator wherein at least some of the video capture module, the video recording module, the video playback module and the event notification module have different communication standards at the video application level and the application program interface of the interface kernel provides a single, unified interface for users interfacing with the video capture module, the video recording module, the video playback module, the event notification module, the management module and the rule generator and where the control options of the application program interface are defined to be independent of specific commands required by the particular recording device to effect these options, thereby relieving a developer of the application program from the task of designing, testing, and verifying each interface to the recording devices, and from the task of integrating compression algorithms with each recording function.

2. The interface kernel of claim 1, including
a video and data transmission module that transmits video or textual data to one or more destinations;
wherein the application program interface accepts commands from the application program to control the video and data transmission module.

3. The interface kernel of claim 1, including
a camera control module that controls one or more of the video sources;
wherein the application program interface accepts commands from the application program to control the camera control module.

4. The interface kernel of claim 3, including:
a location tracking module that communicates with one or more location tracking systems,
wherein:
the application program interface accepts commands from the application program to interact with the location tracking module, and
the management module that controls interactions among one or more of the modules of the kernel and to control the camera control module, based on a result of the location tracking module.

5. The interface kernel of claim 1, including
a video analysis interface module that interacts with one or more video analysis components that analyze one or more of the images to identify one or more characteristics associated with the one or more images;
wherein the application program interface accepts commands from the application program to receive the one or more characteristic.

6. The interface kernel of claim 5, wherein
the management module controls interactions among one or more of the modules of the kernel.

7. The interface kernel of claim 6, including
a transaction terminal module that communicates with one or more transaction terminals;
wherein the management module controls the video analysis interface module based on a result from the video analysis interface module.

8. The interface kernel of claim 6, including
an access control module that communicates with one or more access control systems;
wherein the management module controls the access control module based on a result from the video analysis interface module.

9. The interface kernel of claim 6, including
a location tracking module that communicates with one or more location tracking systems;
wherein the management module controls the location tracking module based on a result from the video analysis interface module.

10. The interface kernel of claim 6, wherein:
the event notification module receives event notifications from one or more external sensors, and
the management module controls the video analysis interface module based on the event notifications.

11. The interface kernel of claim 6, wherein the management module:
determines an event occurrence based on the one or more characteristics,
enables the event notification module to provide a notification based on the event occurrence.

12. The interface kernel of claim 6, wherein the management module:
determines an event occurrence based on the one or more characteristics,
enables the video recording module to record the images based on the event occurrence.

13. The interface kernel of claim 6, wherein the management module:
determines an event occurrence based on the one or more characteristics, control the video recording module to record the images at a frame rate that is based on the event occurrence.

14. The interface kernel of claim 6, including
a camera control module that controls one or more of the video sources; wherein the management module:
determines an event occurrence based on the one or more characteristics,
controls the camera control module based on the event occurrence.

15. The interface kernel of claim 5, including
a video analysis module that corresponds to at least one of the video analysis components.

16. The interface kernel of claim 1, including
a transaction terminal module that communicates with one or more transaction terminals;
wherein the application program interface accepts commands from the application program to interact with the transaction terminal module.

17. The interface kernel of claim 1, including
an access control module that communicates with one or more access control systems;
wherein the application program interface accepts commands from the application program to interact with the access control module.

18. The interface kernel of claim 1, including
a location tracking module that communicates with one or more location tracking systems;
wherein the application program interface accepts commands from the application program to interact with the location tracking module.

19. The interface kernel of claim 1, wherein
the management module controls interactions among one or more of the modules of the kernel.

20. The interface kernel of claim 1, wherein
the video capture module stores the images in a ring buffer that is accessible by one or more of the other modules.

21. The interface kernel of claim 1, wherein
the event notification module receives event notifications from one or more external sensors.

22. A system comprising:
an application program that controls a target system, an interface kernel that includes:
a video capture module that receives images from one or more video sources,
a video recording module that records images to one or more storage devices,
a video playback module that plays back images from the one or more storage devices,
an event notification module that provides one or more notifications to an external notification system based on a detection of an event based on one or more of the images,
a management module that uses a predefined set of rule-based inferences to control one or more of the modules of the system, independently of commands received by the application program interface from the application program; and
a rule generator that provides an interface to a user to define rules for the predefined set of rule-based inferences; and
an application program interface that that is independent of the interface of the rule generator and that accepts commands from the application program to control each of the video capture module, video recording module, video playback module, event notification module, the management module and the rule generator wherein at least some of the video capture module, the video recording module, the video playback module and the event notification module have different communication standards at the video application level and the application program interface of the interface kernel provides a single, unified interface for users interfacing with the video capture module, the video recording module, the video playback module, the event notification module, the management module and the rule generator and where the control options of the application program interface are defined to be independent of specific commands required by the particular recording device to effect these options, thereby relieving a developer of the application program from the task of designing, testing, and verifying each interface to the recording devices, and from the task of integrating compression algorithms with each recording function.

23. The system of claim 22, wherein the target system includes an access control system.

24. The system of claim 22, wherein the target system includes a location tracking system.

25. The system of claim 22, wherein the target system includes a point of sale system.

26. A program on a non-transitory computer-readable medium that, when executed on a processing system, enables the processing system to accept commands from an application program to control each of a video capture module, a video recording module, a video playback module, and an event notification module of the program;

control one or more of the modules of the program using a predefined set of rule-based inferences, independently of commands received from the application program; and provide an interface to a user to define rules for the predefined set of rule-based inferences, the interface being independent of accepting commands from the application program;

wherein:

the video capture module receives images from one or more video sources, the video recording module records images to one or more storage devices, the video playback module plays back images from the one or more storage devices, the event notification module provides one or more notifications to an external notification system based on a detection of an event based on one or more of the images, and at least some of the video capture module, the video recording module, the video playback module and the event notification module have different communication standards at the video application level and the interface provides a single, unified interface for users interfacing with the video capture module, the video recording module, the video playback module and the event notification module and where the control options of the application program interface are defined to be independent of specific commands required by the particular recording device to effect these options, thereby relieving a developer of the application program from the task of designing, testing, and verifying each interface to the recording devices, and from the task of integrating compression algorithms with each recording function.

27. The program of claim 26, wherein the processing system that accepts commands from the application program to control a camera control module of the program, and the camera control module controls one or more of the video sources.

28. The program of claim 26, wherein the processing system interacts with one or more video analysis components that are configured to analyze one or more of the images to identify one or more characteristics associated with the one or more images, and the processing system accepts commands from the application program to receive the one or more characteristics.

29. The program of claim 26, wherein the processing system accepts commands from the application program to interact with a transaction terminal module of the program, and the transaction terminal module communicates with one or more transaction terminals.

30. The program of claim 26, wherein the processing system accepts commands from the application program to interact with an access control module of the program, and the access control module communicates with one or more access control systems.

31. The program of claim 26, wherein the processing system accepts commands from the application program to interact with a location tracking module of the program, and the location tracking module communicates with one or more location tracking systems.

32. The program of claim 26, wherein the processing system controls interactions among one or more of the modules of the program.

33. The program of claim 26, wherein the processing system receives event notifications from one or more external sensors.

* * * * *